N. D. STURGES.
STORAGE BATTERY.
APPLICATION FILED FEB. 27, 1920.

1,340,637.

Patented May 18, 1920.

Norman Dexter Sturges, Inventor
By his Attorneys
Pennie Davis Marvin & Edmonds

UNITED STATES PATENT OFFICE.

NORMAN DEXTER STURGES, OF BELLEROSE QUEENS, NEW YORK, ASSIGNOR TO MULTIPLE STORAGE BATTERY COMPANY, A CORPORATION OF NEW YORK.

STORAGE BATTERY.

1,340,637.   Specification of Letters Patent.   Patented May 18, 1920.

Application filed February 27, 1920. Serial No. 361,888.

*To all whom it may concern:*

Be it known that I, NORMAN DEXTER STURGES, a citizen of the United States, residing at Bellerose Queens P. O., in the county of Queens, State of New York, have invented certain new and useful Improvements in Storage Batteries; and I do hereby declare the following to be a full, clear, and exact description of the invention, such as will enable others skilled in the art to which it appertains to make and use the same.

My invention relates to battery jars and has for its object the provision of a glass jar having walls of uniform thickness so that the jar is less fragile and capable, therefore, of rendering longer and more satisfactory service than it has been possible to obtain from glass battery jars heretofore in general use.

Further objects and advantages of my invention will be apparent as it is better understood by reference to the following specification and the accompanying drawing, in which—

Figure 1:
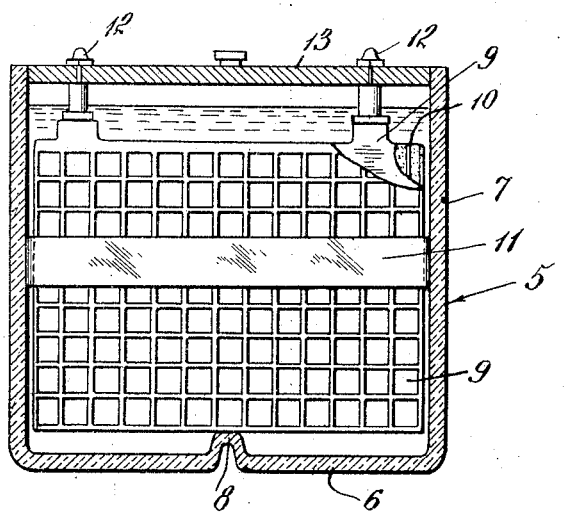
Figure 2:
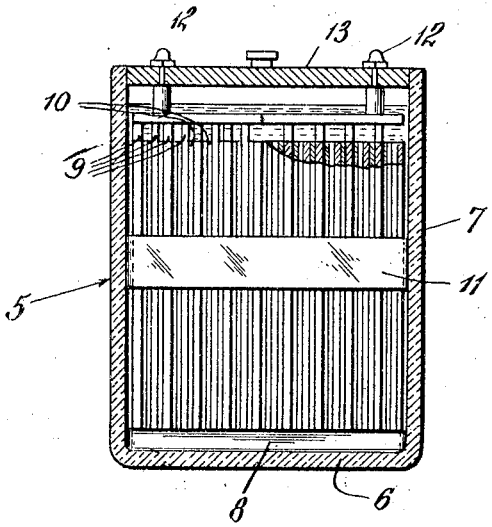

Figure 1 is a transverse section through a battery jar made in accordance with my invention; and Fig. 2 is a section through the jar in a plane normal to that of Fig. 1.

Battery jars are commonly provided with two ribs projecting from the bottom inside the jar upon which the edges of the plates are supposed to rest. Such ribs are readily provided in hard rubber jars but these are expensive and glass jars are preferable. It is, however, practically impossible to produce glass jars having two ribs in the bottom or at best such jars are very fragile because the bottom and walls, particularly adjacent the corners, are very thin. This condition results from the method of making the jars. Such jars are blown into a mold with a blowpipe. The gob of glass on the end of the blowpipe catches at its heavy end between the ridges in the bottom of the mold in such a way that, as the jar is formed, the bottom between the ridges is very thick while outside the ridges the glass is blown very thin. This inequality of the thickness of the glass results in much breakage and the jars are unsatisfactory. To obviate this difficulty, jars with flat bottoms have been made and strips of rubber or other material have been used to form the ridges but without particular success.

I have discovered that the difficulty met in blowing glass jars with two or more ribs in the bottom is entirely obviated when only a single rib is employed, and that the single rib will support the battery plates quite as satisfactorily as two or more ribs which have heretofore been considered essential. When glass is blown into a mold having a single rib it divides evenly on each side of the rib and spreads uniformly over the bottom and sides forming a jar which is much less fragile and therefore more satisfactory than jars having two ribs as above described. It is thus possible to produce glass battery jars which may be employed without separate and loose parts like the ribs of hard rubber or other material which have been suggested as a solution of the difficulty heretofore experienced in producing a commercially practicable battery jar.

As stated, I have discovered that a single rib on the bottom of the jar will support the plates without injury thereto. Doubtless the idea of providing two ribs on the bottom of the jar originated in the desire to support the bottom edges of the plates as uniformly as possible. As a matter of fact, however, examination of a large number of batteries indicates that the plates rarely rest on more than one rib and generally only on a portion of that rib, though two ribs are provided. This results from the fact that the terminals pass up through the top seal and are rigidly held, so that except for accident, the plates cannot find support on more than one of the ribs, since the plates are generally tilted slightly in the jar. Of course, if open top batteries are employed, the plates rest on both ribs but the closed top type is more commonly employed and the facts as stated prove that no injury can come to the plates because they are supported on a single rib and the plates of an open type battery may be similarly supported without damage thereto.

In carrying out my invention, I provide a glass jar having a single rib blown in and extending across the bottom at or near the medial line thereof. Of course, it is not essential that the rib be placed medially of the bottom as it may be displaced toward either side. Preferably, however, the rib is medially disposed and no difficulty is experienced in so forming the jar by blowing the glass into a suitable mold.

Referring to the drawing which is intended merely to illustrate the application of the invention without limiting it to details of the plates or shape of the jar, 5 indicates a glass jar having a bottom 6 and sides 7. A rib 8 is blown in the bottom in substantially the medial line thereof and extending preferably between opposite sides of the jar.

Upon the rib rests a bundle of plates 9 with the usual separators 10, the bundle being arranged transversely to the rib and preferably held together by a binder 11 consisting of a celluloid band as described in my copending application Serial No. 361,887. Of course, other binding means may be employed to hold the plates in assembled relation, my invention being adapted for use with substantially all kinds of batteries employing bundles of plates. As illustrated, terminals extend through a seal 13 which closes the top of the battery. The seal may, however, be omitted when the battery is of the open type.

From the foregoing it will be apparent that I have perfected an arrangement which makes the production of cheap and durable battery jars possible and which overcomes a difficulty, long experienced in the battery art, for which no practicable solution has been heretofore offered.

Various changes may be made in the form and dimensions of the jar and in the particular arrangement of the rib in the bottom thereof without departing from the invention or sacrificing any of the advantages thereof.

I claim:

1. An improvement in storage batteries including a plurality of plates, which comprises a glass jar having a single rib only formed integrally with the bottom of said jar and adapted to support said plates, which are arranged transversely of said rib.

2. An improvement in storage batteries including a plurality of plates, which comprises a glass jar having a single rib only formed integrally with the bottom of said jar and adapted to support said plates, said rib being disposed at or near the medial line of said bottom.

3. A glass battery jar having a single rib only extending across and formed integrally with the bottom thereof, the bottom including said rib and the sides of said jar being of substantially uniform thickness.

In testimony whereof I affix my signature.

NORMAN DEXTER STURGES.